United States Patent [19]

Dadgar

[11] Patent Number: 4,762,625

[45] Date of Patent: Aug. 9, 1988

[54] VISCOSIFIERS FOR BRINES UTILIZING HYDROPHILIC POLYMER-MINERAL OIL SYSTEMS

[75] Inventor: Ahmad Dadgar, Lafayette, Ind.

[73] Assignee: Great Lakes Chemical Corp., West Lafayette, Ind.

[21] Appl. No.: 913,415

[22] Filed: Sep. 29, 1986

[51] Int. Cl.$^4$ .......................... C09K 7/02; E21B 43/00
[52] U.S. Cl. ................................ 252/8.551; 252/8.51; 252/8.514; 252/363.5
[58] Field of Search ................. 252/8.551, 8.51, 8.514, 252/363.5

[56] References Cited

U.S. PATENT DOCUMENTS

| | | |
|---|---|---|
| 4,110,230 | 8/1978 | Hassert et al. . |
| 4,312,675 | 1/1982 | Pickens et al. ...................... 106/171 |
| 4,330,414 | 5/1982 | Hoover .......................... 252/8.551 X |
| 4,336,146 | 6/1982 | Majewiez et al. . |
| 4,392,964 | 7/1983 | House et al. ................. 252/8.551 X |
| 4,427,556 | 1/1984 | House et al. ................. 252/8.551 X |
| 4,459,214 | 7/1984 | House et al. . |
| 4,496,468 | 1/1985 | House et al. . |
| 4,566,977 | 1/1986 | Hatfield ....................... 252/8.551 X |

FOREIGN PATENT DOCUMENTS

2086923-B 1/1984 United Kingdom .

OTHER PUBLICATIONS

Chatterji, J. and Borchardt, J. K., "Applications of Water-Soluble Polymers in the Oil Field", 33 J. Petrol. Technol. 2042–2056 (1981).

*Primary Examiner*—Herbert B. Guynn
*Attorney, Agent, or Firm*—Kirkland & Ellis

[57] ABSTRACT

Alkali and alkaline earth metal and zinc halide brines may be viscosified with compositions incorporating a viscosity inducing hydrophilic polymer, mineral oil, oil soluble non-ionic surfactants, polar solvents, and diluent.

8 Claims, No Drawings

VISCOSIFIERS FOR BRINES UTILIZING HYDROPHILIC POLYMER-MINERAL OIL SYSTEMS

BACKGROUND OF THE INVENTION

1. Field of the Invention

The present invention relates to the preparation and use of novel viscosifier systems which are added to drilling and completion fluids used in oil and gas drilling operations. More particularly the present invention relates to solar solvent-in-oil emulsions which are specially prepared and mixed with high concentrations of conventional viscosifiers increasing their effectiveness.

2. Description of Prior Art

Special fluids called drilling and completion fluids are used in the drilling of oil and gas well. These fluids are essential to drilling operations as they perform a variety of important functions. For example, drilling fluids cool and lubricate drill bits and pipe; prevent damage to producing formations; suspend and remove cuttings from wells; and generally clean out wells. The most effective drilling fluids consist of concentrated salt solutions such as sodium chloride or calcium chloride. These salt solutions or brines may be used alone when drilling shallow wells or in combination with insoluble weighting materials for deep well drilling. In order to maintain the high formation pressure of deep wells, insoluble weighting materials have been added to the drilling solutions. Unfortunately, use of these insoluble weighting materials can present serious problems during completion operations. The insoluble materials can reduce or destroy the permeability of the producing zone by filtering into the formation and impeding the flow of the oil and gas. In recent years, "solids-free" salt and water solutions which have density ranges between 10 and 19.2 pounds per gallon ("lb./gal.") have been developed for deep well drilling. These brines generally require the addition of viscosifiers and other additives to be thoroughly effective. By adding viscosifiers to the brine solutions their ability to suspend and remove cuttings from the well is increased and significant loss of fluids to the formation is prevented.

As disclosed in U.S. Pat. Nos. 4,336,146 and 4,110,230, natural polymers such as guar gum, hydroxypropyl guar, xanthan gum, carboxymethyl cellulose and hydroxyethyl cellulose can be used as viscosifiers when brine solutions are in the 10-19.2 lb./gal. density range. See also Chatterji J. and Borchart J. K.; *J. Pet. Tech.* 2042-2056 (1981). By far the most commonly used viscosifier for brines in the 10-19.2 lb./gal. density range is hydroxyethyl cellulose or "HEC".

The method of addition of HEC and other hydrophilic polymers to brines is very important. If the dry polymer is added to the brine solution without manipulation, the interior of the polymer will not hydrate and the polymer will be prevented from effectively viscosifying the brine. U.S. Pat. No. 4,459,214 and U.K. Pat. No. 2,086,923B disclose a partial resolution to the solvation problem. These patents propose addition of polar organic solvents such as ethylene glycol, propylene glycol and dimethylformamide to the polymer-brine mixtures to increase solvation of the polymer and, therefore, its ability to viscosify brine solutions.

This method of solvation, however, is not completely satisfactory since only about 10 weight percent ("wt. %") of polymer can be dissolved in these polar solvents without insoluble gel formation, whereas liquid viscosifiers containing higher concentrations of polymer are required in order to properly viscosify brine solutions in the 10-19.2 lb./gal. density range with minimum density reduction. Further, when dissolved polymer is left to stand for any extended period (such as 30 days or more), phase separation occurs leading to the formation of a rubbery mass which severly curtails the viscosifier's effectiveness. Moreover, polymer-organic solvent solutions are rarely "pourable" making them difficult to use.

Treatment of viscosifier-brine solutions with high temperature, high shear, and long mixing times has also been found to be effective in increasing solvation of hydrophilic polymer and thus viscosity. Unfortunately, these methods are both expensive and time consuming.

The present invention has for its primary object obtaining a solution to the solvation problem without the necessity of using high temperatures, high shear or long mixing times, while permitting a high concentration of polymer to be dissolved in the brine solutions.

It is thus an object of the present invention to develop a viscosifier system for concentrated salt solutions in the density range of 10-19.2 gal./lb., or 1.05-2.30 g/cc which contains 20-40 wt. % hydrophilic polymer.

Another object of the present invention is to create a "pourable" viscosifier system.

A further object of the invention is to produce a viscosifier system with a minimum shelf live of 6 months which has minimal phase separation.

An additional object of the invention is to create a viscosifier system which yields a minimum funnel viscosity of 200 sec at a concentration of 10 lb./bbl., or greater, within 60 min. at room temperature and low shear.

Another object of the invention is to develop a viscosifier system which is safe to use in all drilling and completion operations with no adverse effects.

Further objects and uses of the present invention will become apparent from the detailed description of the invention and the claims.

SUMMARY OF THE INVENTION

The present invention relates to viscosifier compositions which can effectively viscosify alkali and alkaline earth metal and zinc halide brines in the density range of 10-19.2 lb./gal. without heating, high shear or long mixing times. These systems comprise in the preferred embodiment about 20-35 wt. % viscosity inducing hydrophilic polymer; about 30-55 wt. % mineral oil; about 3-6 wt. % of one or more oil soluble, nonionic surfactants; about 10-40 wt. % of one or more polar solvents emulsified in the mineral oil; and about 5-15% of one or more diluting agents and yield minimal funnel viscosities of 200 sec. at a concentration of 10 lb./bbl. within 60 min. at room temperature and low shear.

Also included within the scope of this invention are viscosified brines comprising a viscosityingly effective amount of the foregoing viscosifying composition incorporated in a 10.0 to 19.2 lb./gal. aqueous solution of one or more alkali and alkaline earth metal and zinc halides. Suitable halides include sodium chloride, sodium bromide, lithium bromide, calcium chloride, calcium bromide, zinc bromide and zinc chloride.

In its method aspect, the present invention encompasses the down-hole use of the viscosified brines of this invention in the completion and work over of oil and gas wells.

DETAILED DESCRIPTION OF THE INVENTION

The present invention discloses liquid viscosifier systems capable of viscosifying concentrated aqueous brines in the density range of 10-19.2 gal./lb. or 1.05 to 2.30 g/cc. These liquid viscosifier systems comprise mineral oil, one or more surfactants, one or more polar solvents, one or more diluting agents and a viscosity inducing hyrophilic polymer, most desirably in the following weight percentages:

30-55 wt. % mineral oil
3-6 wt. % surfactants
10-40 wt. % polar solvents
5-15 wt. % diluting agents
20-35 wt. % hydrophilic polymer Further, addition of about 0.5-1.0 wt. % Bentone clay has been found to make the composition more pourable and, therefore, easier to use.

The above-described composition can be made with any white mineral oil in the viscosity ranges of 70-350 SSU at 100 degrees Fahrenheit. Further, surfactants used in the composition should be oil-soluble and nonionic. Nonlimiting examples of surfactants include alkylaryl polyether alcohols such as octyl- or nonyl phenol based alkylaryl polyether alcohols and polyether compounds such as block copolymers of propylene and ethylene oxides and polyethylene glycol fatty acid esters.

Polar solvents which may be used in the composition include, but are not limited to, any organic alcohols, aliphatic glycerols, and N-methylpyrrolidones in which hydrophilic polymers are soluble and water. Any long chain aliphatic alcohol such as octanol may serve as a diluting agent for the composition. Finally, any viscosity inducing hydrophilic polymer which is soluble in polar solvents and increases the viscosity of brines such as cellulose, carboxymethyl cellulose and hydroxyethyl cellulose or HEC may be used as the hydrophilic polymer of the composition. HEC is preferred in accordance with the present invention.

In general, the viscosifier composition may be prepared by first thoroughly mixing the mineral oil with the surfactant. A mixture of polar organic solvents and diluting agents is then added over a 3 minute period and the resulting emulsion is agitated by a propeller stirrer, initially at 250 rpm and as the emulsion increases in viscosity at 700 rpm. When the mixing is complete the resulting emulsion is stirred by propeller stirrer at 700 rpm for an additional 5 minutes. Bentone Clay may be added to the emulsion to make the overall liquid viscosifier system more pourable. Dry polymer is then slowly added to the emulsion in order to form a good suspension. Other mixing procedures may be used, if desired.

Suitable brines which may be viscosified in accordance with this invention include aqueous solutions containing substantially any alkali and alkaline earth metal and zinc halides. Such brines may be formulated with one or more of the following salts: sodium chloride, sodium bromide, lithium bromide, calcium chloride, calcium bromide, zinc bromide and zinc chloride provided at a density lying in the range of about 10.0 to 19.2 pounds per gallon.

The viscosifier may in turn be admixed with a brine solution in any convenient way to provide the desired viscosified brine. Desirably the viscosifying composition is provided in the brine at a level of about 0.2-10.0, preferably about 0.5-2% by weight of the overall composition.

The viscosifiers of this invention are effective at substantially any pH exhibited by the alkali and alkaline earth metal and zinc halide brines of this invention. Thus, pH does not pose a limitation on the effective utilization of the viscosifiers of this invention.

The following examples are provided for the purpose of further illustration of the preferred embodiments of the present invention and are not intended to be limitations on the disclosed invention.

EXAMPLE I

A liquid viscosifier system for single salt brines such as sodium chloride, calcium chloride, sodium bromide, lithium bromide and calcium bromide, was prepared by first thoroughly mixing 2.0 wt% of "X-207" and 1.0 wt% of "X-45", (alkylaryl polyether alcohol nonionic surfactants commercially available from Rohm and Haas) with 52.5 wt% Semtol-100 Mineral Oil (commercially available from Witco Chemical). A mixture of 3.5 wt% glycerol, 3.5 wt% ethylene glycol and 7.0 wt% water was added over a three minute period and the resulting emulsion was agitated at 250 rpm by a propeller stirrer. As the viscosity of the emulsion increased the agitation speed was raised to 700 rpm. The emulsion was then stirred for an additional 5 minutes at 700 rpm. Next, 0.5 wt% of Bentone Clay from Southern Clay Products, Inc. was added to the emulsion to make the emulsion more pourable. Finally, 30.0 wt% of dry HEC was added slowly to the emulsion and the emulsion was mixed.

In order to determine the effectiveness of utilizing a brine solution containing the foregoing viscosifier as a drilling or completion fluid, various viscosity measurements were made. A Fann viscometer, a type of rotational viscometer, was used to measure the viscosity of the viscosified brine solution. Fann viscometers operate under steady-state conditions so that close approximations of how a fluid would behave in actual industrial circumstances, i.e., stirring, dispersing, pumping, metering, may be obtained. Fann viscometers are widely used for routine evaluations and quality-control measurements. A Fann-35 reading of 150 at 300 r.p.m. indicates that a solution has a sufficient viscosity to act as a fluid loss agent in drilling or completion operations.

Additionally, the Marsh funnel viscosities of the viscosified brine solution were measured. The procedure for measurement of Marsh Funnel Viscosities is described in the API RP 13B Publication (1976, P.S. ), as follows: "The Marsh funnel is dimensioned so that, by following standard procedures, the outflow time of one quart (945 cu. cm.) of fresh water at a temperature of 70 +/−5 degrees Fahrenheit is 26.0+/−0.5 sec." Generally, brine solutions must exhibit funnel viscosities of 200 sec. or better to be effective as pills for stopping the fluid loss to the formation.

Table I, below, presents the funnel viscosities and Fann-35 readings for the viscosifier of Example I provided in in various single salt solutions.

TABLE I

Funnel Viscosity and Fann-35 Readings for Single-Salt Fluids Viscosified with 10 lb/bbl of the Viscosifier of Example I

| Fluid Density at 70° F. lb./gal. | Funnel Viscosity Sec | 600 | 300 | RPM 200 | 100 | 6 | 3 | Time hour |
|---|---|---|---|---|---|---|---|---|
| 10.0 NaCl | 455 | 200 | 159 | 130 | 112 | 35 | 24 | 1 |
| " | 480 | 210 | 160 | 135 | 105 | 31 | 22 | 24 |
| 11.6 CaCl₂ | 1920 | 330 | 280 | 250 | 204 | 88 | 70 | 1 |
| " | 1810 | 325 | 279 | 250 | 201 | 84 | 66 | 24 |
| 12.5 NaBr | 450 | 192 | 154 | 131 | 103 | 36 | 29 | 1 |
| " | 490 | 215 | 172 | 153 | 125 | 48 | 36 | 24 |
| 14.2 CaBr₂ | 320 | 262 | 204 | 175 | 138 | 52 | 40 | 1 |
| " | 1500 | OS* | 295 | 260 | 215 | 99 | 80 | 24 |

*OS = off-scale, greater than 300

These data show that the 10 lb./bbl. of the Example I viscosifier is effective as a viscosifier for all single salt brines. Further, Table I indicates that even lower concentrations of viscosifier, i.e., in the 5.0–7.5 lb./bbl. range, could be used to effectively viscosify brines yielding funnel viscosities of 200 sec. or better.

Additionally, as the data in Table I show, the hydration of HEC in NaCl, NaBr and CaCl₂ solution is complete in one hour (compare funnel viscosity and Fann-35, 600 rpm readings) whereas the hydration of HEC continues to increase with time in CaBr₂ solutions.

Table II presents the Rheology data for the Example I viscosifier in single salt solutions. These data demonstrate the plasticity of fluids at high pressures as in deep well formations. In order to calculate the rheology data in Table II, it has been assumed that the viscosified fluids behave according to the Bingham-plastic model. A Bingham fluid is similar to a Newtonian fluid in that both exhibit straight-line relationship between shear stress and shear rate. However, the Bingham-plastic fluid has an intercept on the shear-stress axis, which is called the yield point (YP). The slope of shear stress versus shear rate line is the plastic viscosity (PV).

The apparent viscosity of Newtonian and plastic fluids is determined by dividing the Fann-35, 600 r.p.m. reading by 2. For a Newtonian fluid (one in which a shear stress versus shear rate plot gives a straight line through the origin), the apparent viscosity is equal to the plastic viscosity. For plastic fluids, such as completion fluids, the apparent viscosity is of limited value because the slope of flow curve cannot be defined by measuring the shear rate at only one speed.

Values for plastic viscosity and yield point were obtained from the Fann-35 reading as follows:

PV = (600 r.p.m.) − (300 r.p.m. reading)
YP = (300 r.p.m.) − (plastic viscosity)

The major shortcoming of using the Bingham plastic model is that it only describes the fluid flow over a very narrow shear rate range of 600 and 300 r.p.m. The shear rate ranges encountered in a typical drilling situation are between 3 and 100 r.p.m. Consequently, the Bingham plastic model may not accurately describe fluid rheological characteristics in all drilling situations.

TABLE II

Rheology Data for Single Salt Fluids Viscosified with 10 lb/bbl of Example I Viscosifier

| Fluid Density at 70° F. lb./gal. | Apparent Viscosity cp | Plastic Viscosity cp | Yield Point lb/100 sq ft | Time Hour |
|---|---|---|---|---|
| 10.0 NaCl | 100 | 41 | 118 | 1 |
| " | 105 | 50 | 110 | 24 |
| 11.6 CaCl₂ | 165 | 50 | 230 | 1 |
| " | 163 | 46 | 233 | 24 |
| 12.5 NaBr | 96 | 38 | 154 | 1 |
| " | 108 | 43 | 129 | 24 |
| 14.2 CaBr₂ | 131 | 58 | 146 | 1 |
| " | OS | OS | OS | 24 |

OS = off-scale, greater than 300

EXAMPLE II

A second liquid viscosifier system was prepared using a procedure identical to that of Example I. The formulation for the liquid viscosifier system of Example II, however, is slightly different than the Example I formulation in that the HEC concentration is decreased and the polar organic solvent concentration is increased. Although the Example I formulation contains 30 wt. % of HEC, it does not viscosify two-salt calcium fluids effectively. Because of the small concentration of the polar solvents in the Example I formulation, most of the HEC is not solvated; hence, it cannot viscosify two-salt fluids. In the formulation of Example II, the concentration of the polar solvents was increased in order to solvate more HEC. Therefore, the concentration of HEC was decreased in order to prevent gel formation. The formulation for the Example II viscosifier is given in Table III.

TABLE III

Weight Percents for Liquid Viscosifier of Example II

| Chemical | Wt. Percent |
|---|---|
| Semtol-100 Mineral Oil | 45.5 |
| X-207 | 2.5 |
| X-45 | 1.0 |
| Glycerol | 3.5 |
| Ethylene glycol | 11.5 |
| Water | 15.0 |
| Bentone | 1.0 |
| HEC | 20.0 |

Fann-35 readings for the viscosifier of Example II are presented in Table IV.

TABLE IV

Fann-35 Readings for Different Fluids Viscosified with 10 lb/bbl of Example II

| Fluid Density at 70° F. lb./gal. | 600 | 300 | RPM 200 | 100 | 6 | 3 | Time Hour |
|---|---|---|---|---|---|---|---|
| 10.0 NaCl | 100 | 76 | 64 | 48 | 12 | 10 | 1 |
| " | 100 | 78 | 67 | 51 | 14 | 9 | 24 |
| 11.6 CaCl₂ | 248 | 185 | 159 | 120 | 50 | 37 | 1 |
| " | 246 | 185 | 155 | 119 | 39 | 26 | 24 |
| 12.5 NaBr | 92 | 70 | 57 | 47 | 11 | 6 | 1 |
| " | 85 | 59 | 48 | 40 | 16 | 12 | 24 |
| 14.2 CaBr₂ | 222 | 168 | 144 | 112 | 41 | 31 | 1 |
| " | 226 | 173 | 148 | 115 | 41 | 30 | 24 |
| 13.5 CaBr₂/CaCl₂ | 210 | 158 | 135 | 102 | 45 | 30 | 1 |
| " | 216 | 162 | 138 | 105 | 36 | 25 | 24 |
| 15.0 CaBr₂/CaCl₂ | 175 | 103 | 75 | 43 | 12 | 6 | 1 |
| " | 253 | 160 | 123 | 85 | 31 | 29 | 24 |

As the data in Table IV indicate, the Example II formulation is capable of viscosifying all CaBr₂ and CaCl₂ fluids but is not as effective as Example I, in viscosifying single-salt brines.

Table V presents the rheology data for the viscosifier of Example II.

TABLE V

Rheology Data for Different Fluids Viscosified with 10 lb/bbl of Example II

| Fluid Density at 70° F. lb./gal. | Apparent Viscosity cp | Plastic Viscosity cp | Yield Point lb/100 sq ft | Time Hour |
|---|---|---|---|---|
| 10.0 NaCl | 50 | 24 | 52 | 1 |
| " | 50 | 22 | 56 | 24 |
| 11.6 CaCl$_2$ | 124 | 63 | 122 | 1 |
| " | 123 | 63 | 122 | 24 |
| 12.5 NaBr | 46 | 22 | 43 | 1 |
| " | 43 | 26 | 33 | 24 |
| 14.2 CaBr$_2$ | 111 | 54 | 114 | 1 |
| " | 113 | 53 | 120 | 24 |
| 13.5 CaBr$_2$/CaCl$_2$ | 105 | 52 | 106 | 1 |
| " | 108 | 54 | 108 | 24 |
| 15.0 CaBr$_2$/CaCl$_2$ | 88 | 72 | 31 | 1 |
| " | 127 | 93 | 67 | 24 |

EXAMPLE III

A liquid viscosifier system for single salt solutions and is prepared according to the procedure of Example I. The ratio of mineral oil to polar organic solvent has been changed from that in Example I. The formulation for Example III is given in Table VI.

TABLE VI

Weight percents for Liquid Viscosifier of Example III

| Chemical | Wt. Percent |
|---|---|
| Semtol 100 Mineral Oil | 43 |
| X-45 | 4 |
| Glycerol | 3 |
| Octanol | 8.6 |
| Water | 5.7 |
| Bentone | 0.7 |
| HEC | 35 |

The funnel viscosities and Fann-35 Readings for Example III are given in Table VII.

TABLE VII

Funnel Viscosity and Fann-35 Readings for Single-Salt Fluids Viscosified with 10 lb/bbl of Example III

| Fluid Density at 70 F. lb./gal. | Funnel Viscosity Sec | RPM 600 | 300 | 200 | 100 | 6 | 3 | Time hour |
|---|---|---|---|---|---|---|---|---|
| 10.0 NaCl | 1765 | 245 | 203 | 184 | 151 | 61 | 46 | 1 |
| " | 1955 | 271 | 226 | 194 | 166 | 80 | 65 | 24 |
| 11.6 CaCl$_2$ | 5700 | OS | OS | OS | 283 | 131 | 110 | 1 |
| " | 11320 | OS | OS | OS | OS | OS | OS | 24 |
| 12.5 NaBr | 500 | 231 | 182 | 163 | 133 | 53 | 40 | 1 |
| " | 520 | 228 | 185 | 164 | 133 | 56 | 41 | 24 |

In comparing the rheology data for Example I and Example II (shown in Tables I and IV), it can be seen that for single-salt solutions at least, the extent of viscosification is a function of HEC concentration and does not depend upon the ratio of polar to nonpolar solvents used in the system. Therefore, in liquid viscosifier system Example III, ethylene glycol was replaced with octanol, diluting the system and suspending more HEC without the formation of a hard gel.

Further, in addition to being more pourable than Example I, Example III exhibits higher rheology for single-salt fluids (compare Tables I and VII). A concentration of 10 lb/bbl of viscosifiers has been used as a basis for comparing the results.

Rheology data for Example III is shown in Table VIII.

TABLE VIII

Rheology Data for Single Salt Fluids Viscosified with 10 lb/bbl of Example III

| Fluid Density at 70° F. lb./gal. | Apparent Viscosity cp | Plastic Viscosity cp | Yield Point lb/100 sq ft | Time Hour |
|---|---|---|---|---|
| 10.0 NaCl | 123 | 42 | 161 | 1 |
| " | 136 | 45 | 181 | 24 |
| 11.6 CaCl$_2$ | OS | OS | OS | 1 |
| " | OS | OS | OS | 24 |
| 12.5 NaBr | 116 | 49 | 133 | 1 |
| " | 113 | 40 | 145 | 24 |

EXAMPLE IV

A liquid viscosifier was prepared using the procedure described in Example I. The ratio of polar solvents to mineral oil or non-polar solvent was changed in order to solvate more HEC. Additionally, the concentration of HEC was decreased to prevent gel formation due to the high concentration of water in the system. The Example IV liquid viscosifier was designed to viscosify all the completion fluids in the density range from 10.0 to 19.2 lb./gal. The formulation of Example IV was similar to Example II, except that ethylene glycol was replaced with octanol and HEC content was increased by 5 wt. %. The Example IV liquid viscosifier, in addition to being more effective than the liquid viscosifier of Example II, is also more pourable. The relative weight percents for this liquid viscosifier are given in Table IX.

TABLE IX

Weight percents for Liquid Viscosifier of Example IV

| Chemical | Wt. Percent |
|---|---|
| Semtol 100 Mineral Oil | 41.5 |
| X-45 | 4.8 |
| Glycerol | 3.5 |
| Octanol | 10.4 |
| Water | 13.8 |
| Bentone | 1.0 |
| HEC | 25.0 |

Funnel viscosity and Fann-35 readings are presented in Table X.

TABLE X

Funnel Viscosity and Fann-35 Readings for Different Fluids Viscosified with 10 lb/bbl of Liquid Viscosifier of Example IV

| Fluid Density at 70 F. lb./gal. | Funnel Viscosity Sec | RPM 600 | 300 | 200 | 100 | 6 | 3 | Time hour |
|---|---|---|---|---|---|---|---|---|
| 10.0 NaCl | 225 | 169 | 134 | 117 | 92 | — | 23 | 2 |
| " | 267 | 169 | 134 | 117 | 92 | — | 23 | 24 |
| 11.6 CaCl$_2$ | 777 | 301 | 232 | 201 | 160 | — | 43 | 2 |
| " | 891 | 314 | 244 | 212 | 169 | — | 57 | 24 |
| 12.5 NaBr | 163 | 182 | 145 | 127 | 101 | — | 28 | 2 |
| " | 233 | 183 | 148 | 129 | 104 | — | 30 | 24 |
| 14.2 CaBr$_2$ | 305 | 243 | 189 | 164 | 130 | — | 42 | 2 |
| " | 468 | 282 | 224 | 159 | 159 | — | 56 | 24 |
| 13.5 CaBr$_2$/CaCl$_2$ | 194 | 236 | 162 | 124 | 90 | — | 20 | 2 |
| 13.5 CaBr$_2$/CaCl$_2$ | 250 | 262 | 181 | 144 | 103 | — | 25 | 24 |
| 15.0 CaBr$_2$/CaCl$_2$ | 125 | 219 | 131 | 97 | 60 | — | 6 | 2 |
| 15.0 CaBr$_2$/ | 170 | 246 | 153 | 117 | 74 | — | 9 | 24 |

TABLE X-continued

Funnel Viscosity and Fann-35 Readings for Different Fluids
Viscosified with 10 lb/bbl of Liquid Viscosifier of Example IV

| Fluid Density at 70 F. lb./gal. | Funnel Viscosity Sec | \multicolumn{6}{c}{RPM} | Time hour |
|---|---|---|---|---|---|---|---|---|
| | | 600 | 300 | 200 | 100 | 6 | 3 | |
| CaCl$_2$ | | | | | | | | |

The fluid flow characteristics for completion fluids are non-Newtonian. Hence the effective viscosities encountered at a given shear rate need to be considered. The Fann-35 readings can be converted to viscosity by using certain conversion factors. For example, for CaCl$_2$ fluids viscosified with 10 lb./bbl. of Example IV (Table X), the actual viscosities at 100 rpm and 3 rpm are 480 cp and 4300 cp, respectively.

The rheology data for Example IV is set forth in Table XI.

TABLE XI

Rheology Data for Single and Two Salt Fluids
Viscosified with 10 lb/bbl of Liquid Viscosifier of Example IV

| Fluid Density at 70° F. lb./gal. | Apparent Viscosity cp | Plastic Viscosity cp | Yield Point lb/100 sq ft | Time Hour |
|---|---|---|---|---|
| 10.0 NaCl | 85 | 35 | 99 | 1 |
| " | 85 | 35 | 99 | 24 |
| 11.6 CaCl$_2$ | 151 | 69 | 163 | 1 |
| " | 157 | 70 | 174 | 24 |
| 12.5 NaBr | 91 | 37 | 108 | 1 |
| " | 92 | 35 | 113 | 24 |
| 14.2 CaBr$_2$ | 122 | 54 | 135 | 1 |
| " | 141 | 58 | 166 | 24 |
| 13.5 CaBr$_2$/CaCl$_2$ | 118 | 74 | 88 | 1 |
| " | 131 | 81 | 100 | 24 |
| 15.0 CaBr$_2$/CaCl$_2$ | 110 | 88 | 43 | 1 |
| " | 123 | 93 | 60 | 24 |

EXAMPLE V

The procedure for preparing another liquid viscosifier is identical to that of Example I. Although the liquid viscosifier of Example IV is effective for both single- and two-salt fluids, two hours of mixing is required to achieve an acceptable viscosity in the two-salt fluids. Further, in order to increase the solvation of HEC in the system, 15 wt. % of N-methyl-2-pyrrolidone was added and the concentration of HEC was decreased. The Example V liquid viscosifier is designed to viscosify both single and two-salt solutions containing calcium and zinc ions in the density range of 11.6 to 19.2 lb./gal. The weight percents for this viscosifier are given in Table XII.

TABLE XII

Weight percents for Liquid Viscosifier of Example V

| Chemical | Wt. Percent |
|---|---|
| Semtol 100 Mineral Oil | 35.1 |
| X-45 | 5.9 |
| Glycerol | 2.9 |
| NMP | 14.6 |
| Octanol | 8.8 |
| Water | 11.7 |
| Bentone | 1.0 |
| HEC | 20.0 |

The Funnel viscosities and Fann-35 readings for Example V are given in Table XIII.

TABLE XIII

Funnel Viscosity and Fann-35 Readings for Different Fluids
Viscosified with 10 lb/bbl of Liquid Viscosifier of Example V

| Fluid Density at 70 F. lb./gal. | Funnel Viscosity Sec | 600 | 300 | 200 | 100 | 6 | 3 | Time hour |
|---|---|---|---|---|---|---|---|---|
| 11.6 CaCl$_2$ | 750 | OS | OS | 247 | 174 | 80 | 53 | 1 |
| " | 930 | OS | OS | 254 | 181 | 86 | 60 | 24 |
| 13.0 CaBr$_2$/CaCl$_2$ | 340 | 254 | 180 | 148 | 110 | 36 | 26 | 1 |
| " | 515 | 295 | 212 | 180 | 133 | 44 | 30 | 24 |
| 13.5 CaBr$_2$/CaCl$_2$ | 495 | 310 | 220 | 185 | 145 | 48 | 35 | 1 |
| " | 730 | OS | OS | 240 | 180 | 62 | 41 | 24 |
| 14.0 CaBr$_2$/CaCl$_2$ | 310 | 278 | 191 | 154 | 108 | 32 | 24 | 1 |
| " | 582 | OS | 244 | 200 | 149 | 53 | 40 | 24 |
| 14.2 CaBr$_2$ | 245 | 220 | 166 | 143 | 112 | 41 | 30 | 1 |
| " | 260 | 223 | 168 | 143 | 114 | 42 | 31 | 24 |
| 15.0 CaBr$_2$ | 215 | 248 | 155 | 121 | 78 | 15 | 10 | 1 |
| " | 280 | 282 | 197 | 181 | 121 | 18 | 16 | 24 |
| 16.5 ZnBr$_2$/CaBr$_2$ | 120 | 189 | 137 | 107 | 78 | 22 | 15 | 1 |
| 17.5 ZnBr$_2$/CaBr$_2$ | 360 | 330 | 244 | 206 | 156 | 59 | 45 | 1 |
| 18.5 ZnBr$_2$/CaBr$_2$ | 3000 | OS | OS | OS | OS | 165 | 137 | 1 |
| 19.2 ZnBr$_2$/CaBr$_2$ | 1590 | OS | OS | OS | 294 | 124 | 102 | 1 |

OS = off-scale, greater than 300

As can be seen from Table XIII, the Example V liquid viscosifier can viscosify all single- and two-salt calcium and zinc fluids in one hour to about 200 cp at 300 rpm.

The rheology data for the viscosifier of Example V is presented in Table XIV.

TABLE XIV

Rheology Data for Different Fluids
Viscosified with 10 lb/bbl of Example V

| Fluid Density at 70° F. lb./gal. | Apparent Viscosity cp | Plastic Viscosity cp | Yield Point lb/100 sq ft | Time Hour |
|---|---|---|---|---|
| 11.6 CaCl$_2$ | OS | OS | OS | 1 |
| " | OS | OS | OS | 24 |
| 13.0 CaBr$_2$/CaCl$_2$ | 127 | 74 | 106 | 1 |
| " | 148 | 83 | 129 | 24 |
| 13.5 CaBr$_2$/CaCl$_2$ | 155 | 90 | 130 | 1 |
| " | OS | OS | OS | 24 |
| 14.0 CaBr$_2$/CaCl$_2$ | 139 | 87 | 104 | 1 |
| " | OS | OS | OS | 24 |
| 14.2 CaBr$_2$ | 110 | 54 | 112 | 1 |
| " | 112 | 55 | 113 | 24 |
| 14.5 CaBr$_2$/CaCl$_2$ | 150 | 97 | 106 | 1 |
| " | 148 | 95 | 105 | 24 |
| 15.0 CaBr$_2$/CaCl$_2$ | 124 | 93 | 62 | 1 |
| " | 141 | 85 | 112 | 24 |
| 16.5 ZnBr$_2$/CaBr$_2$ | 90 | 52 | 85 | 1 |
| 17.5 ZnBr$_2$/CaBr$_2$ | 165 | 86 | 158 | 1 |
| 18.5 ZnBr$_2$/CaBr$_2$ | OS | OS | OS | 1 |

TABLE XIV-continued

| | Rheology Data for Different Fluids Viscosified with 10 lb/bbl of Example V | | | |
|---|---|---|---|---|
| Fluid Density at 70° F. lb./gal. | Apparent Viscosity cp | Plastic Viscosity cp | Yield Point lb/100 sq ft | Time Hour |
| 19.2 ZnBr$_2$/CaBr$_2$ | OS | OS | OS | 1 |

OS = off-scale, greater than 300

The flow characteristics of the fluids viscosified with Example V over the shear-rate ranges normally encountered in the annulus of a wellbore (5–170 sec$^{-1}$) may be expressed by the power law model:

$$\tau = K\gamma^n \quad (1)$$

Where $\tau$ is the shear stress, $\gamma$, the shear rate, K is a proportionality constant, and n is a measure of deviation of a fluid from Newtonian behavior. For the special case of n=1, the fluid is Newtonian, with K being equal to viscosity, $\mu$.

Equation (1) can be presented in the following form:

$$\log \tau = n \log \gamma + \log K \quad (2)$$

We used the rheology data for 13.5 lb./gal. CaBr$_2$/CaCl$_2$ fluid (Table (XIV)) and calculated the values of shear stress, $\tau$, and shear rate, $\gamma$.

A logarighmic plot of $\tau$ versus $\gamma$ gave a straight line with n=0.4 and K=100. The straight line relationship and the value of 0.4 for n, indicate that the fluid is shear-thinning or pseudoplastic (for Newtonian fluid n=1).

The term K is called the consistency index and is indicative of the pumpability or overall thickness of the fluid, and is equal to the viscosity of the fluid at $\gamma = 1.0$ sec$^{-1}$.

Table XIV gives the apparent viscosity, plastic viscosity, and yield point using the data given in Table XIII.

Comparison of Viscosifier Systems in Examples I–V

Considering the results presented in Tables I–XIV, it may be concluded that the liquid viscosifiers of Example III and Example V are the most effective viscosifiers for fluids in the density range of 10.0 to 19.2 lb./gal. although the others may be used. The liquid viscosifier of Example III should be used for sodium chloride, calcium chloride, and sodium bromide fluids (10.0 to 12.5 lb./gal. density range), whereas the liquid viscosifier of Example V is most effective in calcium chloride, calcium bromide, calcium bromide/calcium chloride and zinc bromide/calcium bromide fluids (10.0 to 19.2 lb./gal. density range). Tables XV and XVI present the rheology data for different fluids viscosified with 5.0, 7.5, and 10.0 lb/bbl of the liquid viscosifier of Example III and the liquid viscosifier of Example V.

Tables XV and XVI provide a guideline for choosing appropriate viscosifier concentration for a particular application. As these data indicate, the range of 5 to 10 lb/bbl concentration of the liquid viscosifiers of Example III and Example V are sufficient for most applications encountered in drilling and completion operations.

EXAMPLE VI

Comparison of the Liquid Viscosifiers of Example III and Example V With Other Viscosifiers Using HEC The viscosifier systems of the present invention may be compared with LIQUI-VIS and BROMI-VIS, commercially available HEC viscosifiers from NL-Baroid. LIQUI-VIS is believed to be a 25 wt. % HEC in diesel oil; BROMO-VIS is 20 weight percent in isopropanol. LIQUI-VIS is only moderately effective in sodium chloride, calcium chloride, and sodium bromide fluids (density range of 10.0 to 12.5 lb./gal.). To achieve any viscosification in sodium chloride and sodium bromide fluids, the pH of LIQUI-VIS must be adjusted to 8–9 prior to addition of the viscosifier. LIQUI-VIS does not viscosify calcium bromide and calcium bromide/calcium chloride fluids at all.

BROMI-VIS only viscosifies calcium bromide and calcium bromide/calcium chloride fluids and not sodium chloride or sodium bromide solutions. It also forms a hard gel making its utilization somewhat difficult.

OSCA-VIS, a viscosifier commercially available from Oilfield Service Corporation of America, contains 10 wt. % HEC solvated with ethylene glycol. At 10 lb/bbl, it is only moderately effective in calcium bromide/calcium chloride fluids. To make OSCA-VIS effective in sodium chloride and sodium bromide fluids, it is necessary to adjust the pH to 8–9 and to use concentrations of 30–40 lb/bbl of viscosifier.

Table XVII presents the comparative rheology data for brines viscosified with 10 lb/bbl of the viscosifier systems of the present invention and commercial viscosifiers. From Table XVII it is clear that the liquid viscosifiers of Example III and Example V are superior to other products.

The data in Table XVII clearly shows:

(1) BROMI-VIS and OSCA-VIS at 10 lb/bbl do not viscosify NaCl and NaBr fluids. Whereas, at the same concentration, the liquid viscosifier of Example III exhibits high values for funnel viscosity, apparent viscosity, plastic viscosity, and yield point.

(2) Only after pH adjustment can LIQUI-VIS viscosify NaCl and NaBr fluids. The liquid viscosifier of Example III viscosifies NaCl and NaBr without any pH adjustment and the viscosities obtained are higher than those achieved with other products.

(3) BROMI-VIS is not effective in CaCl$_2$ fluid. Although OSCA-VIS and LIQUI-VIS can viscosify CaCl$_2$, the values are significantly lower than those obtained with Example III.

(4) In CaBr$_2$ and all CaBr$_2$/CaCl$_2$ blends, Example V exhibits higher rheology than all the other viscosifiers.

TABLE XV

| Rheology Data for Different Fluids Viscosified with 5.0, 7.5, and 10.0 lb/bbl of Example III 1 hr Mixing | | |
|---|---|---|
| Concentration of Example III lb/bbl | Funnel Viscosity sec | Viscosity at 170 sec$^1$ cp |
| 10.0 lb./gal. Sodium Bromide | | |
| 5.0 | 75 | 159 |
| 7.5 | 220 | 249 |
| 10.0 | 1765 | 453 |
| 11.6 lb./gal. Calcium Chloride | | |
| 5.0 | 265 | 282 |
| 7.5 | 1092 | 504 |
| 10.0 | 5700 | 849 |
| 12.5 lb./gal. Sodium Bromide | | |
| 5.0 | 90 | 165 |
| 7.5 | 200 | 267 |
| 10.0 | 500 | 399 |

TABLE XVI

Rheology Data for Different Fluids Viscosified with Varying Concentrations of Example V
1 hr Mixing

| Concentration of Example V lb/bbl | Funnel Viscosity sec | Viscosity at 170 sec$^1$ cp |
|---|---|---|
| 11.6 lb./gal. Calcium Chloride | | |
| 5.0 | 240 | 294 |
| 7.5 | 360 | 426 |
| 10.0 | 750 | 522 |
| 13.0 lb./gal. Calcium Bromide/Calcium Chloride | | |
| 5.0 | 110 | 150 |
| 7.5 | 225 | 246 |
| 10.0 | 340 | 330 |
| 13.5 lb./gal. Calcium Bromide/Calcium Chloride | | |
| 5.0 | 120 | 204 |
| 7.5 | 275 | 309 |
| 10.0 | 495 | 435 |
| 14.0 lb./gal. Calcium Bromide/Calcium Chloride | | |
| 5.0 | 95 | 126 |
| 7.5 | 165 | 207 |
| 10.0 | 310 | 324 |
| 14.2 lb./gal. Calcium Bromide | | |
| 5.0 | 70 | 117 |
| 7.5 | 125 | 198 |
| 10.0 | 245 | 336 |
| 14.5 lb./gal. Calcium Bromide/Calcium Chloride | | |
| 5.0 | 95 | 120 |
| 7.5 | 130 | 186 |
| 10.0 | 340 | 345 |
| 15.0 lb./gal. Calcium Bromide/Calcium Chloride | | |
| 5.0 | 75 | 120 |
| 7.5 | 95 | 150 |
| 10.0 | 215 | 234 |
| 16.5 lb./gal. Zinc Bromide/Calcium Bromide | | |
| 10 | 60 | 84 |
| 15 | 65 | 108 |
| 20 | 120 | 234 |
| 17.5 lb./gal. Zinc Bromide/Calcium Bromide | | |
| 10 | 90 | 159 |
| 15 | 185 | 303 |
| 20 | 360 | 468 |
| 18.5 lb./gal. Zinc Bromide/Calcium Bromide | | |
| 10 | 215 | 336 |
| 15 | 680 | 648 |
| 20 | 3000 | OS |
| 19.2 lb./gal. Zinc Bromide/Calcium Bromide | | |
| 10 | 155 | 276 |
| 15 | 655 | 660 |
| 20 | 1590 | 882 |

TABLE XVII

Rheology Data for Brines Viscosified with 10 lb/bbl of Different Viscosifiers
1 hour Mixing at Room Temperature

| Viscosifier | Funnel Viscosity sec | Apparent Viscosity cp | Plastic Viscosity cp | Yield Point lb/100 sq ft |
|---|---|---|---|---|
| 10.0 lb./gal. Sodium Chloride | | | | |
| LIQ UI-VIS* | 240 | 81 | 39 | 94 |
| BROMI-VIS* | — | 40 | 21 | 39 |
| OSCA-VIS* | 39 | 20 | 14 | 12 |
| Example III | 1765 | 123 | 42 | 161 |
| 11.6 lb./gal. Calcium Chloride | | | | |
| LIQUI-VIS | 381 | 120 | 68 | 104 |
| BROMI-VIS | — | 87 | 48 | 78 |
| OSCA-VIS | 103 | 58 | 44 | 28 |
| Example III | 5700 | OS | OS | OS |
| 12.5 lb./gal. Sodium Bromide | | | | |
| LIQUI-VIS* | 110 | 71 | 31 | 80 |
| BROMI-VIS* | — | 50 | 24 | 52 |
| OSCA-VIS* | 40 | 21 | 13 | 17 |
| Example III | 500 | 116 | 49 | 113 |
| 14.2 lb./gal. Calcium Bromide | | | | |
| LIQUI-VIS | 55 | 40 | 29 | 22 |
| BROMI-VIS | — | 93 | 46 | 94 |
| OSCA-VIS | 65 | 49 | 33 | 32 |
| Example V | 275 | 116 | 56 | 120 |
| 13.5 lb./gal. Calcium Bromide/Calcium Chloride | | | | |
| LIQUI-VIS | — | 35 | 30 | 10 |
| BROMI-VIS | — | 107 | 100 | 15 |
| OSCA-VIS | 165 | 97 | 65 | 65 |
| Example V | 495 | 160 | 100 | 120 |
| 15.0 lb./gal. Calcium Bromide/Calcium Chloride | | | | |
| LIQUI-VIS | — | 32 | 31 | 1 |
| BROMI-VIS | — | 160 | 50 | 220 |
| OSCA-VIS | 208 | 136 | 111 | 51 |
| Example V | 215 | 132 | 96 | 72 |

*Must adjust pH to 8-9 to be effective
OS = off-scale

Physical Properties

Freezing points, pour points, and flash points have been determined for the viscosifiers of both Example III and Example V. These data are given in Table XVIII. Both viscosifiers were stable over a period of 7 days during cycles of 80 to 30 degrees Fahrenheit and 80 to 140 degrees Fahrenheit.

TABLE XVIII

Freezing Point, Pour Point, and Flash Point for Example III and Example V

| Viscosifier | Freezing Point* °F. | Pour Point** °F. | Flash Point*** °F. |
|---|---|---|---|
| Example III | <−20 | <−10 | >200 |
| Example V | <−20 | <−10 | >200 |

*Defined as a total solid point from cooling
**ASTM Method D97
***Tag closed cup

Temperature/Viscosity Profile

In order to establish the change of viscosity as a function of temperature, the fluids were viscosified with the viscosifiers of Example III and Example V, and the temperature/viscosity profiles were obtained using a Fann-50 viscometer. The data are presented in Table XIX.

TABLE XIX

Temperature/Viscosifier Profile of Different Fluids at 170 sec$^1$ Viscosified with 10 lb./bbl. of Example III or Example V
Viscosity/cp (after 900 min.)

| Temp °F. | 10.0$^a$ NaCl | 12.5$^a$ NaBr | 11.6$^a$ CaCl$_2$ | 14.2$^b$ CaBr$_2$ | 13.5$^b$ CaBr$_2$/CaCl$_2$ | 15.0$^b$ CaBr$_2$/CaCl$_2$ |
|---|---|---|---|---|---|---|
| 70 | 566 | 527 | 531 | 363 | 566 | 402 |
| 100 | 500 | — | — | 300 | 495 | 365 |
| 125 | 410 | — | — | 215 | 430 | 289 |
| 150 | 305 | — | — | 130 | 310 | 200 |
| 176 | 225 | — | — | 100 | 205 | 145 |
| 200$^c$ | 135 | — | — | 85 | 135 | 106 |
| 150$^d$ | 156 | 64 | 80 | 56 | 68 | 54 |

$^a$Example III used
$^b$Example V used
$^c$Held for two hours at this temperature
$^d$Held for 15 hours at this temperature The results in Table XIX indicate that at a shear rate of 170 sec$^{-1}$ and room temperature, the effective viscosities of these fluids are between 350 and 560 cp. The change of viscosity as a function of temperature and time is gradual, and the fluids maintain a viscosity of 100 cp at 200° F. as expected for any HEC based viscosifier.

Viscosification of Calcium-Free Fluids with Viscosifier of Example V

Clear drilling and completion fluids also have utility in wells which contain subterranean carbonates and sulfates. Unfortunately use of calcium ion containing clear fluids in these types of wells has resulted in formation damage caused by precipitation and calcium carbonate and calcium sulfate from the clear fluids. In some instances, sodium bromide fluid has been used in place of calcium ion containing fluids in relatively shallow wells where high formation pressures are not encountered. More recently however, sulfate and carbonate containing wells have been discovered which require use of drilling and completion fluids with fluid densities well above those of sodium bromide (i.e., in the 14–20 lb./gal. density range). Copending patent application Ser. No. 892,155, filed July 30, 1986, disclose a series of calcium-free fluids for use as oil field completion, packer and perforating media. These calcium-free fluids are formulated by mixing zinc bromide or zinc chloride with alkali metal halides (NaCl, NaBr, KCl, KBr, LiCl, and LiBr) and water. Preferably these calcium-free fluids are formulated by mixing zinc bromide with alkali metal bromides (NaBr, KBr and LiBr) and water. These fluids have densities in the range of 8.5 to 21.0 lb./gal. and pH's in the range of 1.0 to 7.5. The concentration ranges of zinc bromide and alkali metal bromides in these fluids are 4–77 wt.% and 2–55 wt.%, respectively.

The calcium-free fluids disclosed in the Ser. No. 892,155 patent application may be easily viscosified with the viscosifier of Example V. Tables XX and XXI present funnel viscosity and rheology data for different zinc bromide/sodium bromide and zinc bromide/potassium bromide fluids viscosified with the liquid viscosifier of Example V.

TABLE XX

Funnel Viscosity and Rheology Data for Calcium-Free Fluids (ZnBr$_2$/NaBr) Viscosified With 15 lb./bbl. of Example V One Hour Mixing

| Fluid Density at 70° F. lb/gal | Funnel Viscosity sec | Fann RPM 600 | Fann RPM 300 | Apparent Viscosity cp | Plastic Viscosity cp | Yield Point lb/100 sq ft |
|---|---|---|---|---|---|---|
| 15.0 | 366 | 269 | 213 | 135 | 86 | 157 |
| 15.5 | 419 | 285 | 230 | 143 | 55 | 175 |
| 16.0 | 409 | OS | 241 | OS | OS | OS |
| 16.5 | 383 | OS | 240 | OS | OS | OS |
| 17.5 | 595 | OS | 279 | OS | OS | OS |
| 19.0 | 1195 | OS | OS | OS | OS | OS |

OS = off-scale, greater than 300

TABLE XXI

Funnel Viscosity and Rheology Data for Calcium-Free Fluids (ZnBr$_2$/KBr) Viscosified with 15 lb./bbl. of Example V

| Fluid Density at 70° F. lb/gal | Funnel Viscosity sec | Fann RPM 600 | Fann RPM 300 | Apparent Viscosity cp | Plastic Viscosity cp | Yield Point lb/100 sq ft |
|---|---|---|---|---|---|---|
| 15.0 | 210 | 226 | 183 | 113 | 43 | 140 |
| 15.5 | 310 | 260 | 214 | 130 | 46 | 168 |
| 16.0 | 350 | 259 | 207 | 130 | 52 | 155 |
| 16.5 | 320 | 276 | 224 | 138 | 52 | 172 |
| 17.5 | 605 | OS | 289 | OS | OS | OS |
| 18.5 | 530 | OS | 286 | OS | OS | OS |
| 19.0 | 471 | OS | 281 | OS | OS | OS |

TABLE XXI-continued

OS = off-scale, greater than 300

These data show that the Example V viscosifier at a concentration of 15 lb./gal. is an effective viscosifier for the zinc ion-containing calcium-free fluids in the density range of 15.0 to 19.0 lb./gal. Zinc bromide/calcium bromide fluids in the density range of 15.0 to 16.5 lb./gal. are difficult to viscosify, apparently because of structural changes in the solvent and solute caused by the different concentration ratios of halide to zinc ion. The data in Tables XIX and XX clearly indicate the effectiveness of Example V viscosifier in calcium-free fluids. Therefore, calcium-free fluids viscosified with Example V offer new viscosified fluids in the density range of 15.0 to 16.5 lb./gal.

I claim:

1. A viscosifying composition for aqueous alkali and alkaline earth metal and zinc halide brines used in the drilling and completion of oil and gas wells comprising:
   about 20 to 35 percent of a viscosity inducing hydrophilic polymer selected from the group consisting of hydroxyethyl cellulose and carboxymethyl cellulose;
   about 30 to 55 percent mineral oil;
   about 3 to 6 percent of at least one oil soluble nonionic surfactant;
   about 10 to 40 percent of at least one liquid polar solvent in which the hydrophilic polymer is soluble, said solvent being emulsified in said mineral oil; and
   about 5 to 15 percent of a long chain aliphatic alcohol diluting agent, all by weight of the composition.

2. A composition, as claimed in claim 1, wherein the mineral oil has a viscosity range of about 70 to 350 SSU at 100° F.

3. A composition, as claimed in claim 1, wherein the oil soluble nonionic surfactant is a member selected from the group consisting of alkylaryl polyether alcohols, block copolymers of ethylene and propylene oxides and polyethylene glycol fatty acid esters, and mixtures thereof.

4. A composition, as claimed in claim 1, wherein the liquid polar solvent is a member selected from the group consisting of alcohols, aliphatic glycols, N-methylpyrrolidone, water and mixtures thereof.

5. A composition, as discussed in claim 1, and further comprising Bentone clay.

6. A viscosified clear high density fluid adapted for use as a well completion, packing and performation medium comprising:
   an aqueous solution of at least one member selected from the group consisting of alkali and alkaline earth metal and zinc halides having a density lying in the range of about 10.0–19.2 pounds per gallon; and
   a viscosifying composition comprising:
   about 20 to 35 percent of a viscosity inducing hydrophilic polymer selected from the group consisting of hydroxyethyl cellulose and carboxy methyl cellulose;

about 30 to 55 percent mineral oil;

about 3 to 6 percent of at least one oil soluble non-ionic surfactant;

about 10 to 40 percent of at least one liquid polar solvent in which the hydrophilic polymer is soluble, said solvent being emulsified in said mineral oil; and about 5 to 15 percent of a long chain aliphatic alcohol diluting agent, all by weight of the composition.

7. A fluid, as claimed in claim 6, wherein the aqueous solution comprises a member selected from the group consisting of sodium chloride, sodium bromide, lithium bromide, calcium chloride, calcium bromide, zinc bromide and mixtures thereof.

8. In a method of completion or workover of wells wherein a high-density fluid is injected into the well to exert sufficient hydrostatic pressure to control the well, the improvement comprising employing the viscosified clear fluid of claim 6.

* * * * *

UNITED STATES PATENT AND TRADEMARK OFFICE
CERTIFICATE OF CORRECTION

PATENT NO. : 4,762,625

DATED : August 9, 1988

INVENTOR(S) : Dadgar, Ahmad

It is certified that error appears in the above-identified patent and that said Letters Patent is hereby corrected as shown below:

Col. 1, line 17 "well" should be --wells--

Col. 2, line 29 "live" should be --life--

Col. 2, line 50 delete space between "55" and "wt."

Col. 2, line 58 "viscosityingly" should be --viscosifyingly--

Col. 4, line 50 "r.p.m." should be --rpm--

Col. 11, line 26 "(Table(XIV)" should be --(Table XIV)--

Col. 11, line 40 the heading "Comparison of Viscosifier Systems in Examples I-V" should be underlined Col. 14, line 54 "14.2b" should be deleted Col. 14, line 6 the heading "Viscosification of Calcium-Free Fluids with Viscosifier of Example V" should be underlined

UNITED STATES PATENT AND TRADEMARK OFFICE
CERTIFICATE OF CORRECTION

PATENT NO. : 4,762,625

DATED : August 9, 1988

INVENTOR(S) : Dadgar, Ahmad

It is certified that error appears in the above-identified patent and that said Letters Patent is hereby corrected as shown below:

Col. 15, line 12 "and" should be --of--

Col. 15, line 23 "disclose" should be --discloses--

Signed and Sealed this

Twenty-first Day of March, 1989

Attest:

DONALD J. QUIGG

*Attesting Officer*       *Commissioner of Patents and Trademarks*